(12) United States Patent
Erdemir et al.

(10) Patent No.: US 11,615,244 B2
(45) Date of Patent: Mar. 28, 2023

(54) DATA EXTRACTION AND ORDERING BASED ON DOCUMENT LAYOUT ANALYSIS

(71) Applicant: Oracle International Corporation, Redwood Shores, CA (US)

(72) Inventors: Erhan Erdemir, Plymouth, MN (US); Kenneth James Peterka, Minong, MN (US)

(73) Assignee: Oracle International Corporation, Redwood Shores, CA (US)

( * ) Notice: Subject to any disclaimer, the term of this patent is extended or adjusted under 35 U.S.C. 154(b) by 178 days.

(21) Appl. No.: 16/776,721

(22) Filed: Jan. 30, 2020

(65) Prior Publication Data

US 2021/0240932 A1 Aug. 5, 2021

(51) Int. Cl.
*G06F 40/289* (2020.01)
*G06V 30/413* (2022.01)
(Continued)

(52) U.S. Cl.
CPC .......... *G06F 40/289* (2020.01); *G06V 30/413* (2022.01); *G06V 30/416* (2022.01); *G06V 30/10* (2022.01)

(58) Field of Classification Search
CPC ............. G06F 40/174; G06F 16/24578; G06F 16/258; G06F 16/3347; G06F 16/353;
(Continued)

(56) References Cited

U.S. PATENT DOCUMENTS 5,737,442 A 4/1998 Hassan
5,784,487 A * 7/1998 Cooperman ....... G06K 9/00469
382/112
(Continued)

FOREIGN PATENT DOCUMENTS

| CN | 104881488 B | 4/2017 |
| CN | 106802884 A | 6/2017 |
| EP | 1739574 B1 | 9/2007 |

OTHER PUBLICATIONS

Clausner et al., "The Significance of Reading Order in Document Recognition and its Evaluation", 12th International Conference on Document Analysis and Recognition, 2013, pp. 688-692.
(Continued)

*Primary Examiner* — Wilson W Tsui
(74) *Attorney, Agent, or Firm* — Invoke

(57) ABSTRACT

The embodiments disclosed herein relate to identifying phrases in an electronic document, where each token is one or more characters. Phrases are formed from the tokens, based on a position of each token relative to other tokens in the document. If the horizontal space between two tokens is less than a threshold, the two tokens are identified as a phrase. Information identifying phrases and tokens can be stored in a marked-up document. Value phrases can be identified by the content of the phrase. Thereafter, a label phrase can be identified based on proximity to the value phrase and/or the presence of an association symbol in the phrase. The label phrase and value phrase can be identified as a label-value pair, where the label identifies the type of content in the value phrase. A reading order of the document can be determined through the use of a binary tree.

24 Claims, 11 Drawing Sheets

(51) Int. Cl.
*G06V 30/416* (2022.01)
*G06V 30/10* (2022.01)

(58) Field of Classification Search
CPC ...... G06F 16/5846; G06F 16/93; G06F 40/12; G06F 40/289; G06F 40/284; G06F 40/30; G06K 2209/01; G06K 9/00449; G06K 9/00442; G06K 9/00456; G06K 9/00463; G06K 9/00469; G06K 9/2054; G06K 9/72; G06V 30/413; G06V 30/416; G06V 30/10

See application file for complete search history.

(56) References Cited

U.S. PATENT DOCUMENTS

| | | | | |
|---|---|---|---|---|
| 6,175,844 | B1* | 1/2001 | Stolin | G06V 30/414 715/210 |
| 6,336,124 | B1* | 1/2002 | Alam | G06F 40/258 715/205 |
| 6,405,175 | B1* | 6/2002 | Ng | G06Q 30/02 705/14.26 |
| 7,970,213 | B1* | 6/2011 | Ruzon | G06K 9/723 382/229 |
| 8,249,356 | B1 | 8/2012 | Smith | |
| 9,495,347 | B2 | 11/2016 | Stadermann et al. | |
| 9,613,267 | B2* | 4/2017 | Déjean | G06V 30/40 |
| 9,720,896 | B1 | 8/2017 | Wu et al. | |
| 10,241,992 | B1 | 3/2019 | Middendorf et al. | |
| 10,706,322 | B1* | 7/2020 | Yang | G06T 7/70 |
| 10,878,195 | B2 | 12/2020 | Duta | |
| 2006/0271847 | A1* | 11/2006 | Meunier | G06K 9/00469 715/205 |
| 2013/0318426 | A1 | 11/2013 | Shu et al. | |
| 2014/0064618 | A1* | 3/2014 | Janssen, Jr. | G06K 9/00469 382/182 |
| 2016/0104077 | A1 | 4/2016 | Jackson et al. | |
| 2017/0220859 | A1* | 8/2017 | Grams | G06T 7/13 |
| 2018/0373952 | A1 | 12/2018 | Bui et al. | |
| 2019/0005322 | A1 | 1/2019 | Tripathi et al. | |
| 2019/0171704 | A1 | 6/2019 | Buisson et al. | |
| 2020/0050845 | A1* | 2/2020 | Foncubierta Rodriguez | G06V 30/412 |
| 2020/0117944 | A1* | 4/2020 | Duta | G06F 16/355 |
| 2020/0311410 | A1* | 10/2020 | Prasad | G06K 9/344 |
| 2021/0019287 | A1 | 1/2021 | Prasad et al. | |

OTHER PUBLICATIONS

Klampfl et al., "A Comparison of Two Unsupervised Table Recognition Methods from Digital Scientific Articles", D-Lib Magazine, vol. 20, No. 11/12, 2014, 13 pages.

Liu et al., "TableSeer: Automatic Table Extraction, Search, and Understanding", Department of Information Sciences and Technology, 2009, 171 pages.

Pan et al., "Document layout analysis and reading order determination for a reading robot", TENCON 2010—2010 IEEE Region 10 Conference, 2010, 2 pages.

Perez-Arriaga et al., "TAO: System for Table Detection and Extraction from PDF Documents", Proceedings of the Twenty-Ninth International Florida Artificial Intelligence Research Society Conference, 2016, pp. 591-596.

Thomas M. Breuel, "Layout Analysis based on Text Line Segment Hypotheses", available online at <https://pdfs.semanticscholar.org/e29b/5846e096fa3e858c8da73eb0dde2bf6f812b.pdf>, 4 pages.

* cited by examiner

DATA EXTRACTION AND ORDERING BASED ON DOCUMENT LAYOUT ANALYSIS

TECHNICAL FIELD

The present disclosure relates to document layout analysis. Specifically, the disclosure is directed to extracting text from documents in a logical reading order based on document layout analysis.

BACKGROUND

There are many instances in which information needs to be extracted from an electronic document. This can include instances in which a paper document is scanned or photographed and made into an electronic format. This can also include instances in which a document is received in a generic electronic format or image-based format (such as PDF or JPG).

Optical character recognition (OCR) is a method of processing an image or document to find text within the image or document. OCR converts images of typed, handwritten, or printed text into machine-encoded text. One may desire to take information from the electronic document or image file and convert it into machine-encoded data so that the machine-encoded data can be electronically edited, searched, stored more compactly, displayed on-line, or used in machine processes. Once machine-encoded, data can be converted into a format that is more easily capable of processing, such as a format readable by spreadsheets, accounting programs, and the like.

OCR is widely used for the conversion of text documents (such as books, newspapers, magazines, and the like). OCR extracts text line-by-line from left to right. As a result, conventional OCR techniques work well for extracting data from electronic documents that primarily include text in paragraph forms. The extracted paragraphs can be stored or presented in an intelligible manner.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
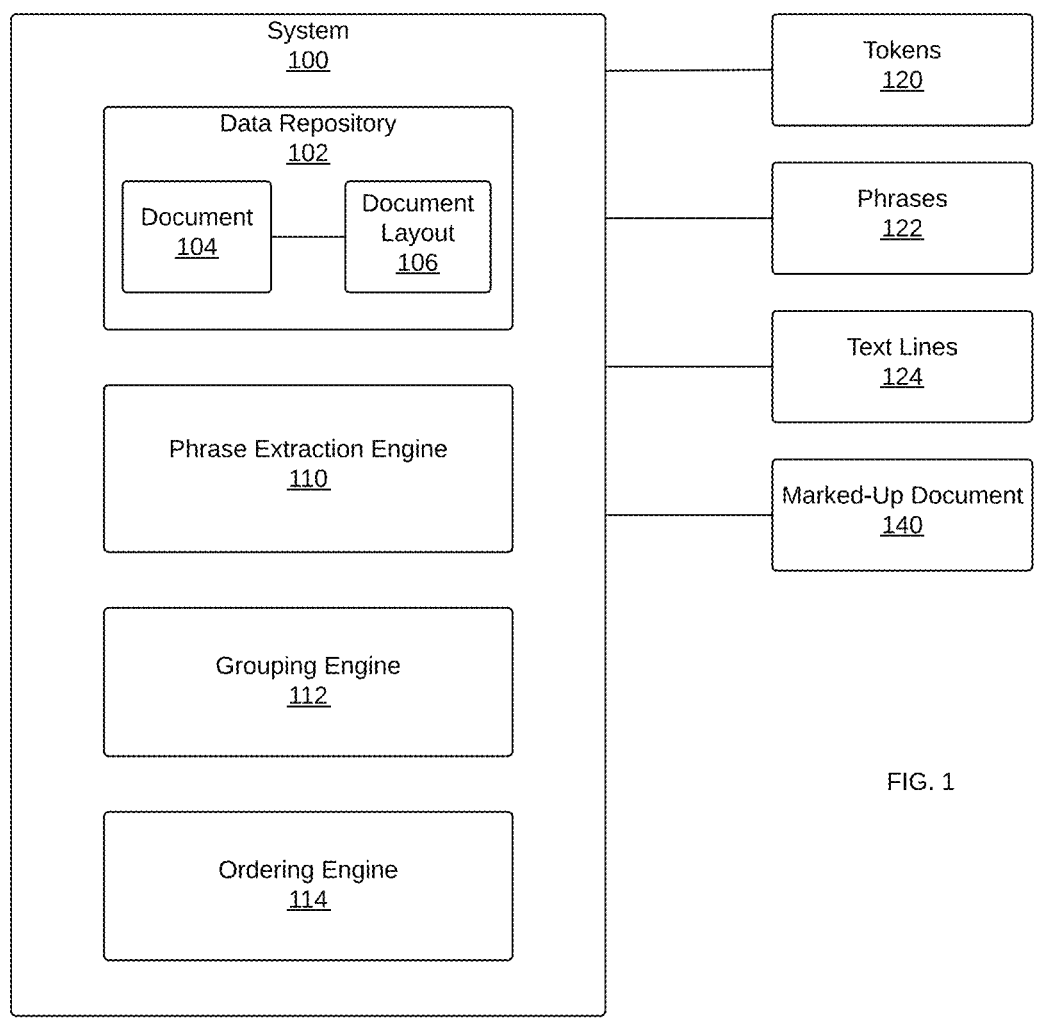
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CONTENT EXTRACTION SYSTEM
3. EXTRACTING, MERGING, AND GROUPING PHRASES
4. USING A BINARY TREE TO ORDER PHRASE GROUPS
5. BOUNDING BOXES
6. EXAMPLE INVOICE
7. HARDWARE OVERVIEW

1. General Overview

One or more embodiments extract and group content from an electronic document. Content, as referred to herein, may include any textual, numerical, symbolic characters that may correspond to, for example, labels and values. The system may group content in label-value pairs. Content that is grouped together in a particular group is stored, streamed, presented, or otherwise used together without content from other groups being intermingled between the content from the particular group. Grouping content in label-value pairs results in each label and corresponding value being ordered one after the other without any intervening content. In an example, the six phrases extracted from an invoice may be grouped into three label-value groups as follows: group 1 ("Invoice Number", "345"), group 2 ("Date", "Jan. 1, 1970"), and group 3 ("Invoice Total", "$30"). The grouping ensures each label-value pair is used together. A stream may then include "Invoice Number 345 Date Jan. 1, 1970 Invoice Total $30" where all content from each group is streamed together without any intervening content. In this example, the stream does not intermingle content assigned to different groups (such as an intermingled stream "Invoice Date 345 Jan. 1, 1970 Invoice Total $30" where the value "345" for the label "Invoice Number" does not immediately follow the label "Invoice Number").

One or more embodiments group content in label-value pairs based on document layout analysis. A single phrase or multiple phrases in combination may be identified as part of a label or a value. A phrase is determined to be a value based on the phrase including a digit or a currency symbol. A phrase may be determined to be a value based on a location of the phrase within a page and/or a document. A candidate phrase, of a set of candidate phrases that are within a threshold distance of a value, is determined to be a label for the value. Factors for determining that a candidate phrase is a label for the value include, but are not limited to, a distance of the candidate phrase from the value, a position-direction of the candidate phrase in relation to the value, and any association symbol (for example, a colon) included within the candidate phrase, location of the phrase within a page, index of a page (that includes the phrase) within the document. Each label-value pair of phrases is stored, streamed, presented, or otherwise referenced without any intervening phrases inserted between the label and the corresponding value.

One or more embodiments may order content extracted from an electronic document. As noted above, the system groups content extracted from an electronic content into a set of groups. The system may then order the groups for storing, streaming, presenting, or referencing. The order of the groups is based on a position of each group within the electronic document and a distance of each group in relation to other groups. A position of a group is based on a position of each of the members of the group. In an example, a bounding box is determined for each group such that the box includes all members of the group. The (x and y) coordinates of points on the perimeter of the bounding box may be used for determining the position of the corresponding group, or the distance of the group to other groups.

One or more embodiments described in this Specification and/or recited in the claims may not be included in the General Overview section.

2. Content Extraction System

FIG. 1 is a block diagram that illustrates components of a computing system, in accordance with one or more embodiments. System 100 includes components for extracting, grouping, and ordering content from an electronic document. In one or more embodiments, system 100 may include more or fewer components than the components illustrated in FIG. 1. The components illustrated in FIG. 1 may be local or remote from each other. The components may be implemented in software and/or hardware. Each component may be distributed over multiple applications and/or machines. Multiple components may be combined into one application and/or machine. Operations described with respect to one component may instead be performed by another component.

System 100 includes one or more data repositories 102. A data repository is any type of storage unit and/or device (e.g., a file system, database, collection of tables, or any other storage mechanism) for storing data. Further, data repository 102 may include multiple different data storage units and/or devices. The multiple different storage units and/or devices may or may not be of the same type or located at the same physical site.

Data repository 102 may be implemented or may execute on the same computing system as phrase extraction engine 110. Alternatively or additionally, data repository 102 may be implemented or executed on a separate computing system than phrase extraction engine 110. Data repository 102 may be communicatively coupled to phrase extraction engine 110 via a direct connection or via a network.

Document 104 may be obtained by the system 100 from the data repository 102 or from another source. The document 104 may be received using an electronic transmission such as email, instant messaging, or short message system. The document 104 can be in any type of electronic format. Common electronic formats include portable document format ("PDF"), JPEG, TIFF, PNG, DOC, and DOCX. Document 104 may be converted to the electronic format from a non-electronic format. For example, document 104 may have originally been in paper form. Document 104 may be converted to an electronic format using a scanner, a camera, or a camcorder. In some embodiments, the document 104 may have been created in an electronic format and received by the system in an electronic format. Documents may include content corresponding to receipts, invoices, income statements, balance sheets, cash flow statements, estimates, and tables.

Phrase extraction engine 110 corresponds to hardware and/or software configured to extract data from document 104. Phrase extraction engine 110 may include OCR components to detect text within the document 104. Phrase extraction engine 110 may be used to extract tokens 120, phrases 122, and text lines 124 from the document 104.

A text line 124 refers to a set of characters that are positioned approximately along a single horizontal line. Accordingly, characters on the same text line 124 have overlapping vertical positions within the electronic document.

A token 120 corresponds to one or more of contiguous characters in a text line 124. A token 120 may include letters, digits, symbols or a combination thereof. Tokens may be separated from one another by any number of spaces. Tokens may also be separated by one another from another delimiter such as a colon.

A phrase 122 corresponds to a set of tokens that is intended to describe a single element (e.g., a label or a value). Examples of phrases include "Invoice Number", "Total Cost", and "three-legged blue stool." A phrase 122 may also include a single token. For example, "Description" may be referred to as a phrase 122. A phrase 122 may include tokens across multiple text lines 124. In an example, a shipping address includes the street address on a first text line, and the city, state, and zip code on a second text line. Both lines of the shipping address may be identified as belonging to a single phrase 122.

A grouping engine 112 corresponds to hardware and/or software configured to group phrases together into a single group. Two phrases that are grouped together in a single group are streamed, stored, presented, or otherwise used in a contiguous manner without any intervening phrases. In an example, the grouping engine 112 groups extracted values with corresponding labels as described below. The grouping engine 112 may order members of a group in a particular order. As an example, a group may include a label and a corresponding value in an order such that the label precedes the corresponding value in a representation of the members of the group.

In an embodiment, the grouping engine 112 groups phrases together based on a document layout 106. The document layout 106, as referred to herein, includes a position of a phrase within the document 104. The document layout 106 may further include a distance of phrase from other phrases within the document 104. The document layout 106 may define bounding boxes for any phrase or token within the document 104. A bounding box is not necessarily drawn within document 104 itself. A bounding box is defined by a set of (x and y) coordinates which represent a box such that the box if drawn would enclose the corresponding phrase or content. The (x and y) coordinates of the bounding box are used for determining or representing a position and a distance with respect to a corresponding phrase. The (x and y) coordinates of the bounding box may be normalized. In an example, normalizing an x-coordinate includes dividing the x-coordinate with a width of the page that includes the x-coordinate. Normalizing a y-coordinate includes dividing the y-coordinate with a height of the page that includes the y-coordinate. The normalized values may then range from 0 to 1. In another example, the x-coordinates and y-coordinates may be divided by a maximum of a page width and a page height, preserving the aspect ratio of the page.

An ordering engine 114 corresponds to hardware and/or software configured to order groups of phrases generated by the grouping engine 112. The ordered set of groups are streamed stored, presented, or otherwise used in accordance with an order determined by the ordering engine 114. In an example, a first group of phrases is positioned to the left of a second group of phrases within the document 104. The ordering engine 114 may order the first group of phrases prior to the second group of phrases. As a result, the first group of phrases may be included in a content stream prior to the second group of phrases.

In an embodiment, the ordering engine 114 orders groups of phrases using a binary tree. A binary tree 130 is a data structure used to determine a reading order of the content in document 104. The binary tree 130 is generated based on groups of phrases determined by the grouping engine 112. A binary tree has at most two children, which may be referred to as a left child and a right child. A binary tree may be used as a representation of data with a relevant bifurcating structure. In such examples, the particular arrangement of nodes under and/or to the left or right of other nodes is part of the information.

A parameter (not illustrated) used in a grouping or ordering algorithm may be determined based on a training set of documents. Each document in the training set has a known characteristic. The known characteristic may be specified via a user input. The training set of documents is input to the algorithm to determine one or more parameters. The parameters are determined such that, when the algorithm applies the parameters to the training set of documents, the algorithm returns results that best matches the known characteristics. The process of determining the parameter used in an algorithm is also referred to herein as "machine learning."

Marked-up document 140 is a modified version of document 104. Marked-up document 140 may include content, from document 104, in an optimized reading order. The content may be represented in a format that is more readily usable by other computerized applications. Marked-up document 140 may be generated using a markup language such as eXtensible Markup Language ("XML") or other suitable markup language. Marked-up document 140 may be in a proprietary format for use with spreadsheets, databases, or other application format. The marked-up document may represent content, extracted from document 104, in a single stream of groups.

System components as described above may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a server, a web server, a network policy server, a mainframe, a television, a content receiver, a set-top box, a printer, a mobile handset, a smartphone, and/or a personal digital assistant ("PDA").

3. Extracting, Merging, and Grouping Phrases

Figure 2A:
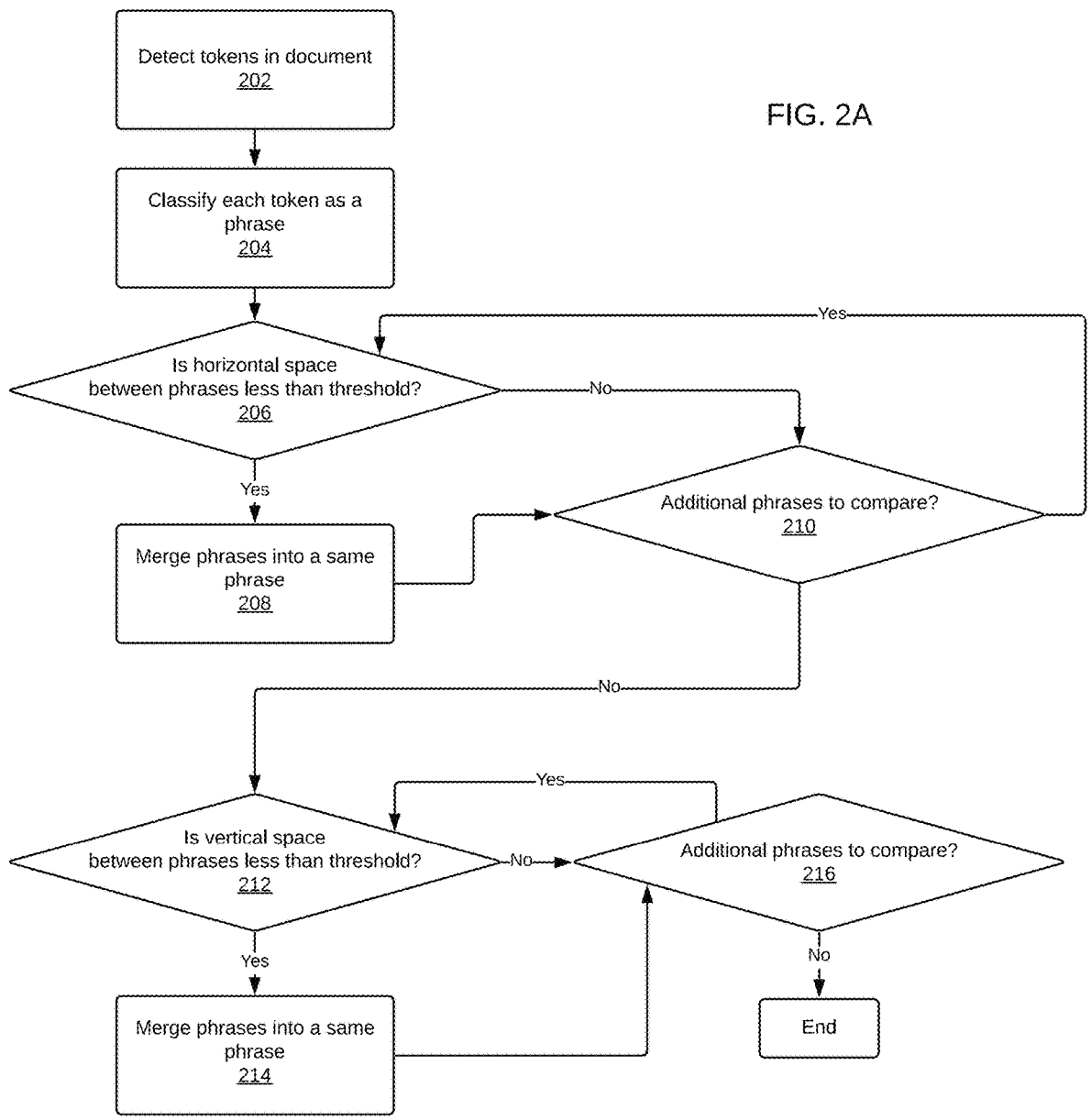
FIG. 2A is a flow diagram that illustrates the forming of phrases, in accordance with one or more embodiments.
Figure 2B:
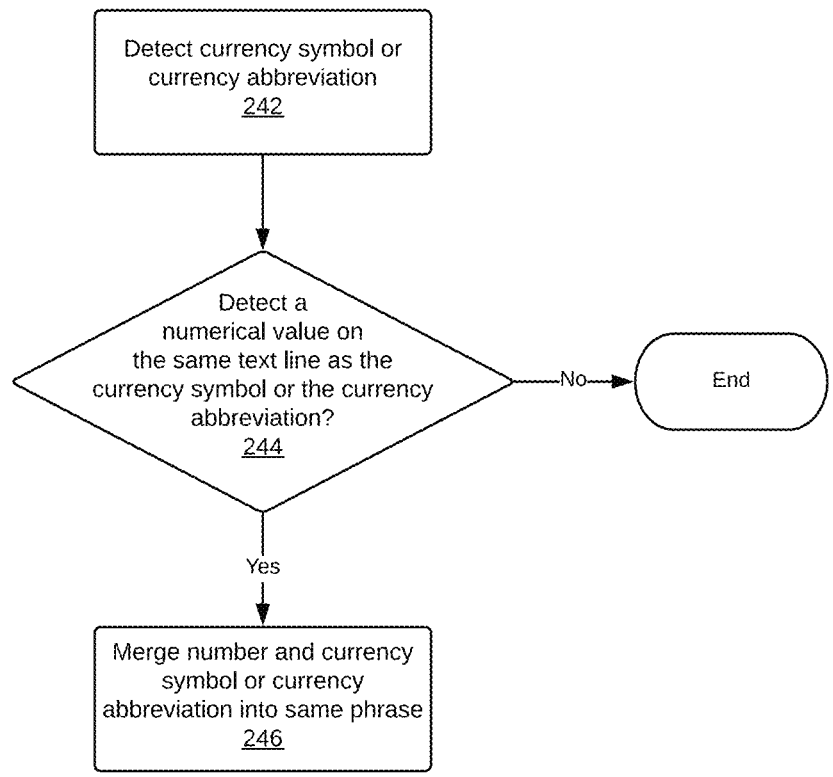
FIG. 2B is a flow diagram that illustrates the identification of value phrases, in accordance with one or more embodiments.

FIGS. 2A-2B illustrate operations for extracting and merging phrases in accordance with one or more embodiments. One or more operations illustrated in FIGS. 2A-2B may be modified, rearranged, or omitted altogether. Accordingly, the particular sequence of operations illustrated in FIGS. 2A-2B should not be construed as limiting the scope of one or more embodiments.

Initially, the system detects tokens in a document in accordance with an embodiment (Operation 202). Detecting tokens includes detecting words or a contiguous set of characters within the document. A space between a first set of characters and a second set of characters may be used to partition the characters into separate tokens. The first set of characters representing a first word may be classified as a first token. The second set of characters representing a second word may be classified as a second token that is different from the first token. OCR techniques may be used to identify words or contiguous sets of characters within the document. A set of characters may be assigned to a same token based on similar characteristics. As an example, character width and character height of each of a set of characters may be compared to determine whether the set of characters may be assigned to a same token. If the absolute or percentage difference in character width or character height exceeds a threshold value, the characters may be assigned to different tokens.

In an embodiment, each token may be classified as a phrase or considered a phrase (Operation 204) for the purpose of evaluating phrase mergers as described in operations 206-216. The operations described below in relation to phrase mergers may first be applied to merge tokens into a single token prior to the phrase mergers.

Sets of two or more phrases may be merged together to form a single phrase. In an embodiment, the system merges sets of phrases together if the sets of phrases meet a merging criteria. As an example, phrases are merged together if the would-be merged phrase matches a known label. Consecutive phrases "Invoice" and "Number" are merged together in response to determining that "Invoice Number" is a known label that is included in a listing of known labels. A merging criteria may require that the phrases have the same font or same font size.

In an example, phrases may be merged together into a single phrase based on a horizontal space between the phrases or a vertical space between the phrases. Specifically, if the horizontal space between phrases is less than a threshold (Operation 206), then the phrases are merged into a same phrase (Operation 208). Similarly, if the vertical space between phrases is less than a threshold (Operation 212), then the phrases are merged into a same phrase (Operation 214). The thresholds may be determined as a function of the height and/or width of the characters within the phrases. The merging operations are repeated if there are additional pairs or groups of phrases to evaluate for mergers (Operations 210 and 216).

FIG. 2B illustrates operations for merging a currency symbol or currency abbreviation with a corresponding currency value into a same phrase. The system detects a currency symbol or currency abbreviation (Operation 242). For example, the system detects the currency symbol "$", or an abbreviation "USD" for United States Dollar. Alternatively, or additionally, the system may also detect the currency written in complete form (e.g., "Yen"). Detecting the currency symbol or the currency abbreviation triggers a search for numerical values to the right and/or to the left of the detected currency symbol or currency abbreviation. The search for numerical values may be, but is not necessarily, limited to numerical values in the same text line as the currency symbol or currency abbreviation. The search for numerical values may be, but is not necessarily, limited to a threshold distance from the detected currency symbol or the currency abbreviation. Numerical values that are separated from the currency symbol or currency abbreviation by another intervening phrase do not qualify for the merging operation. If a qualifying numerical value is detected (Operation 244), the numerical value is merged with the currency symbol or currency abbreviation into the same phrase (Operation 246). If a numerical value is identified on each of the right and left sides of the currency symbol or currency description, a value selection process may be executed. The value that is the closest may be selected for merging with the currency symbol or currency description. Alternatively, a value is selected based on training using an appropriate sample set. The training dictates the standard position of the numerical value in relation to the currency symbol or currency abbreviation. As an example, the system may be trained using marked-up sample invoices to select the numerical value to the right of a currency symbol for all invoices from the company Closets and More.

Figure 2C:
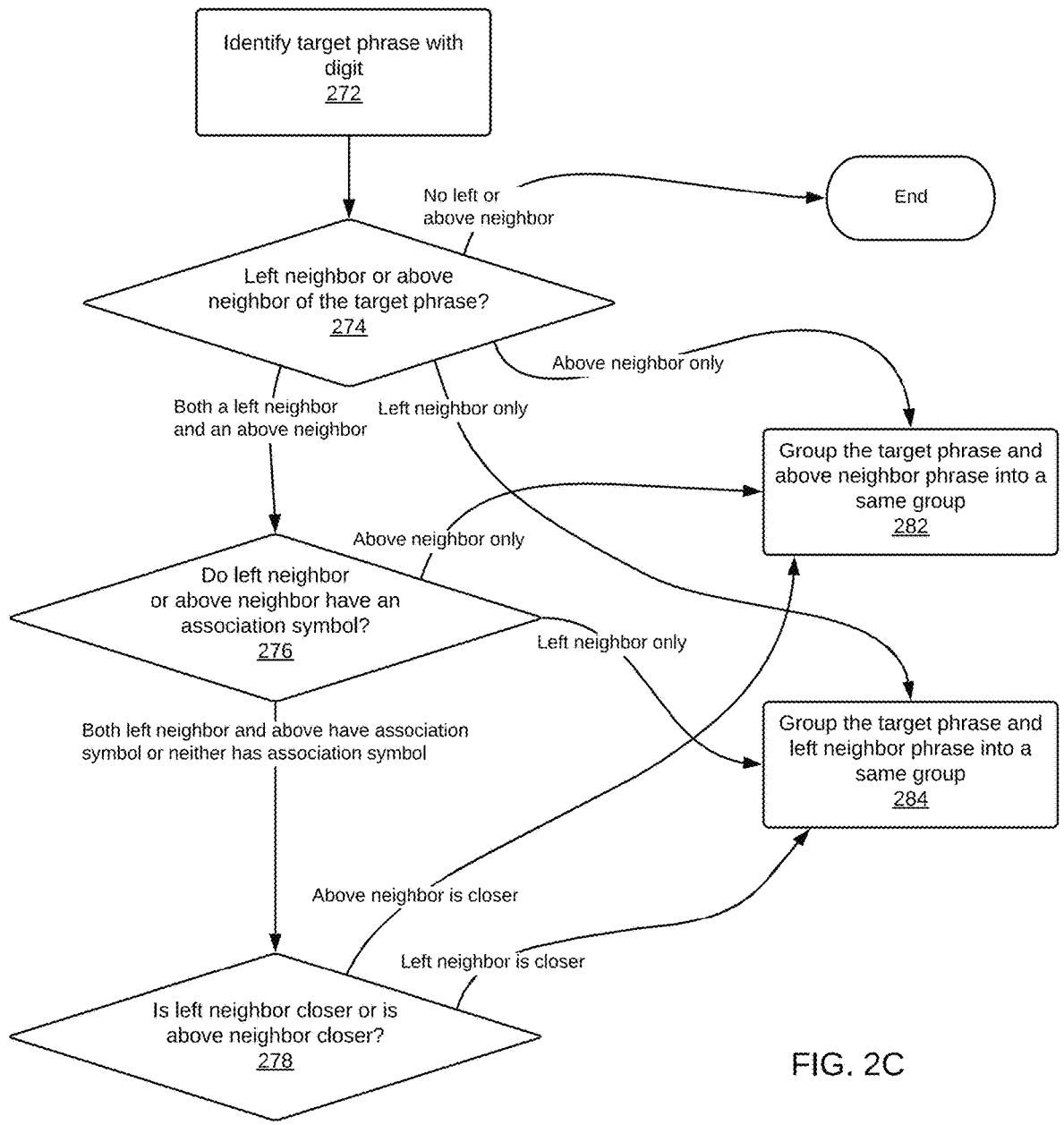
FIG. 2C is a flow diagram that illustrates the formation of label-value pairs, in accordance with one or more embodiments.

FIG. 2C illustrates operations for grouping phrases in accordance with one or more embodiments. A pair of phrases may be identified as a label-value pair. A label-value pair includes a phrase that is determined to be a label for a value recited in the other phrase of the label-value pair. One or more operations illustrated in FIG. 2C may be modified, rearranged, or omitted altogether. Accordingly, the particular sequence of operations illustrated in FIG. 2C should not be construed as limiting the scope of one or more embodiments.

Initially, the system detects a target phrase that includes a digit (operation 272). A digit is any of the numerals 0 through 9. A phrase that includes a digit may be referred to herein as a value. Responsive to detecting the target phrase, i.e., the value, the system attempts to search for a label corresponding to the value. In most documents, labels for any value are generally positioned above the value, or to the left of the value. Accordingly, the system searches for labels above the value and to the left of the value.

The system determines whether the target phrase has a left-neighbor or an above-neighbor (operation 274). A left neighbor is a phrase that is to the left of the target phrase without any intervening phrases. The left neighbor is on the same text line as the target phrase within a tolerance level. A left neighbor classification of a phrase may be limited to phrases that are within a threshold distance to the left of the target phrase.

An above neighbor is a phrase that is above the target phrase in the electronic document. An above neighbor has a horizontal position that at least partially overlaps with the horizontal position of the target phrase. An above neighbor classification of a phrase may be limited to phrases that are within a threshold distance above the target phrase.

If the system only detects an above neighbor (and no left neighbor), then the system determines that the above neighbor includes a label for the value in the target phrase. The system groups the above neighbor and the target phrase into the same group (Operation 282). If the system only detects a left neighbor (and no above neighbor), then the system determines that the left neighbor includes a label for the value in the target phrase. The system groups the left neighbor and the target phrase into the same group (Operation 284).

Grouping the label-value pair into the same group, as described above, results in the system storing, streaming, presenting, or otherwise using the label and value together without any intervening phrases. Grouping the label-value pair into the same group may include storing the value in association with a database field that corresponds to the label.

If the system detects both an above neighbor and a left neighbor, both the above neighbor and left neighbor are analyzed to detect any association symbols (operation 276). An association symbol is a character that indicates that a particular phrase is associated with another phrase. A colon ":" and a dash "-" are common association symbols. In many label-value pairs recited within documents, the label ends with a colon. In an example, the label "Total:" (that is associated with a numerical value corresponding to the total cost of goods) ends with a colon. The system relies on association labels to detect a label corresponding to the value detected in operation 272.

If the system only detects that the above neighbor includes an association symbol (and the left neighbor does not include any association symbol), then the system determines that the above neighbor includes a label for the value in the target phrase. The system groups the above neighbor and the target phrase into the same group (Operation 282). If the system only detects that the left neighbor includes an association symbol (and the above neighbor does not include any association symbol), then the system determines that the left neighbor includes a label for the value in the target phrase. The system groups the left neighbor and the target phrase into the same group (Operation 284).

If either (a) both the above neighbor and the left neighbor include association symbols or (b) neither the above neighbor nor the left neighbor includes association symbols, the system identifies a label based on distance from the target phrase. The system determines which of the above neighbor or the left neighbor is closer to the target phrase (Operation 278). The distance between the target phrase and a neighboring phrase is computed by calculating the Cartesian distance between the bounding boxes of the target phrase and the neighboring phrase. Bounding boxes are described below with reference to FIG. 4.

If the system determines that the above neighbor is closer to the target phrase than the left neighbor, then the system determines that the above neighbor includes a label for the value in the target phrase. The system groups the above neighbor and the target phrase into the same group (Operation 282). If the system determines that the left neighbor is closer to the target phrase than the above neighbor, then the system determines that the left neighbor includes a label for the value in the target phrase. The system groups the left neighbor and the target phrase into the same group (Operation 284).

The process, as described above with reference to FIG. 2C, may be repeated for any phrase with a digit. The resulting set of label-value pairs generated via the above process may be marked in the electronic document itself or identified in a data set external to the electronic document. Content of the electronic document may be streamed such that phrases merged together into the same group are streamed, stored, presented, or otherwise used together without any intervening phrases that are external to the group of phrases.

Phrases within a group may be ordered (intra-group ordering) for streaming, storage, presentation, or other use. Phrases that have been determined to have a particular type, such as a "label" or "value", may be ordered based on type. For example, a group of phrases that includes a label and a value is streamed such that the label is ordered prior to the value.

In an embodiment, the groups of phrases are ordered (inter-group ordering) for streaming, storage, presentation, or other use. The groups of phrases may be ordered based on a position of each group in the electronic document. The position of the group may be determined as a function of a minimum-sized bounding box that encloses all phrases of the group. An (x, y) coordinate of a particular corner (e.g., top left corner) of the bounding box may be used as the position of the group of phrases. In an example, a first group of phrases is positioned to the left of a second group of phrases in an electronic document. Based on the first group of phrases being positioned to the left of the second group of phrases, the first group of phrases is ordered prior to the second group of phrases. In another example, a group of phrases is ordered before other groups of phrases with a lower vertical position in the electronic document. In yet another example, a group of phrases on a page of the electronic document is ordered before other groups of phrases that are on subsequent pages of the electronic document.

In one example, the distances between groups of phrases is used to determine the inter-group ordering of the groups of phrases. The order is generated using a binary tree as described below with reference to FIGS. 3A and 3B.

4. Using a Binary Tree to Order Phrase Groups

Groups of phrases such as label-value pairs, that are generated in accordance with the operations described above, may be linearly read out, streamed, stored, presented or otherwise used. Phrases within each particular group are defined as a single unit for any use such that the phrases are streamed or otherwise used without intermingling with phrases from other groups. As described above, phrases within a group may be ordered (intra-group ordering) such that each label is ordered immediately before the corresponding value.

Figure 3A:
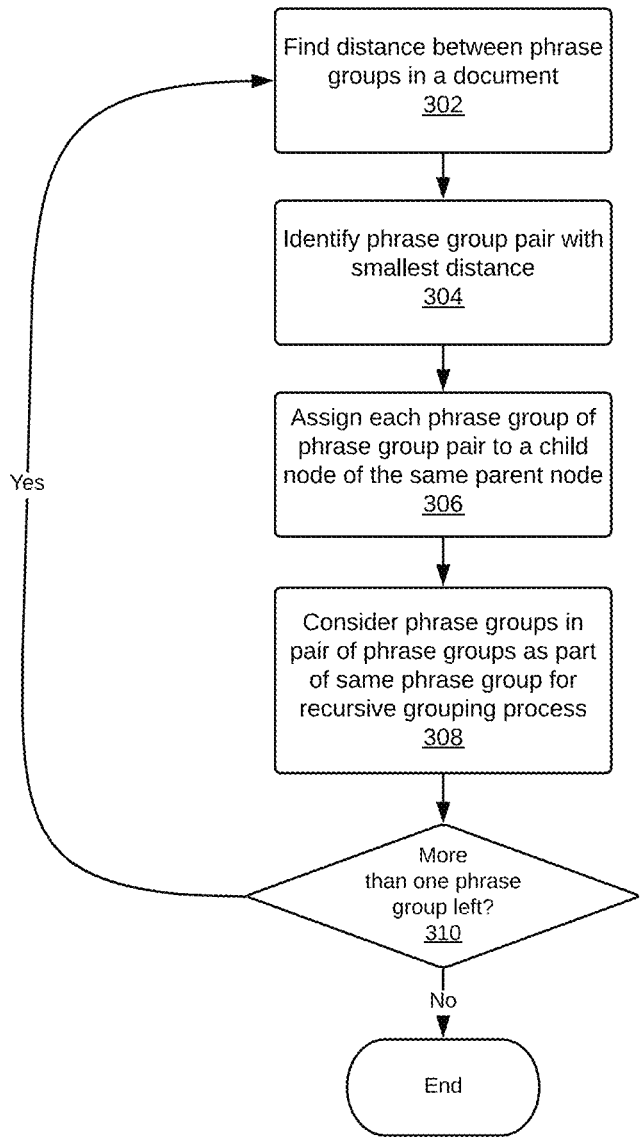
FIG. 3A is a flow diagram that illustrates the formation of label-value pairs, in accordance with one or more embodiments.

Different groups of phrases may be ordered in a particular sequence (inter-group ordering). An example of an ordering methodology that uses a binary tree is described below with reference to FIGS. 3A and 3B. FIG. 3A illustrates operations for generating a binary tree representing groups of phrases in accordance with one or more embodiments. A group of phrases, as referred to herein, may include a single phrase if the phrase was not merged with another phrase in the phrase grouping process described above. Each leaf node in the binary tree represents a phrase group as determined via operations described above with reference to FIG. 2C. Non-leaf nodes, i.e., parent nodes, represent a temporary grouping of groups of phrase groups that is used for ordering the phrase groups that correspond to the leaf nodes.

One or more operations illustrated in FIG. 3A may be modified, rearranged, or omitted altogether. Accordingly, the particular sequence of operations illustrated in FIG. 3A should not be construed as limiting the scope of one or more embodiments.

For every pair of phrase groups on a page, a distance between the bounding boxes of the phrase groups is determined (operation 302). In other words, the distance between a first phrase group in an electronic document and a second phrase group in the electronic document is determined. The distance may be a Cartesian distance between the closest corners of the phrase groups resulting in the minimum distance between the phrase groups. Then a distance between the first phrase group on a page and a third phrase group on the page is determined. The distance computations are repeated until the distances between every combination of pairs of groups of phrases is determined. In an example, the distances between every possible pair of phrase groups may be stored in a lookup table. The lookup table may be generated at the beginning of the process and updated as phrase groups are combined.

Thereafter, the particular pair of phrase groups with the smallest distance between them is identified (Operation 304). Each phrase group in the particular pair of phrase groups is assigned to a respective child node of the same, new parent node (Operation 306). Accordingly, a new parent node is created with each execution of Operation 306. Furthermore, each phrase group in the particular pair of phrase groups is considered grouped for performing recursive grouping operations until a single phrase group is left (Operation 308). Considering each group in the particular pair of phrase groups as grouped together involves (a) generating a new bounding box that includes all phrase groups corresponding to either of the particular pair of phrase groups and (b) using the new bounding box for determining distances to other phrase groups in the next recursive execution of the process.

The recursive grouping is continued until a single phrase group is left (Operation 310). In some alternative embodiments, the above recursive operations can be terminated prior to reaching a single phrase group. As an example, the recursive operations may be terminated based on the number of phrase groups remaining. As the groups are considered grouped together, per Operation 308, the total number of separate phrase groups reduces. When a threshold number of separate phrase groups is reached, the recursive operations may be terminated. In another example, the recursive operations may be terminated based on the smallest distance between the remaining groups. As the pairs of phrase groups with the smallest distance is considered grouped together for the recursive process, the smallest distance between remaining groups increases. When the smallest distance reaches a threshold value, the recursive operations may be terminated.

Figure 3B:
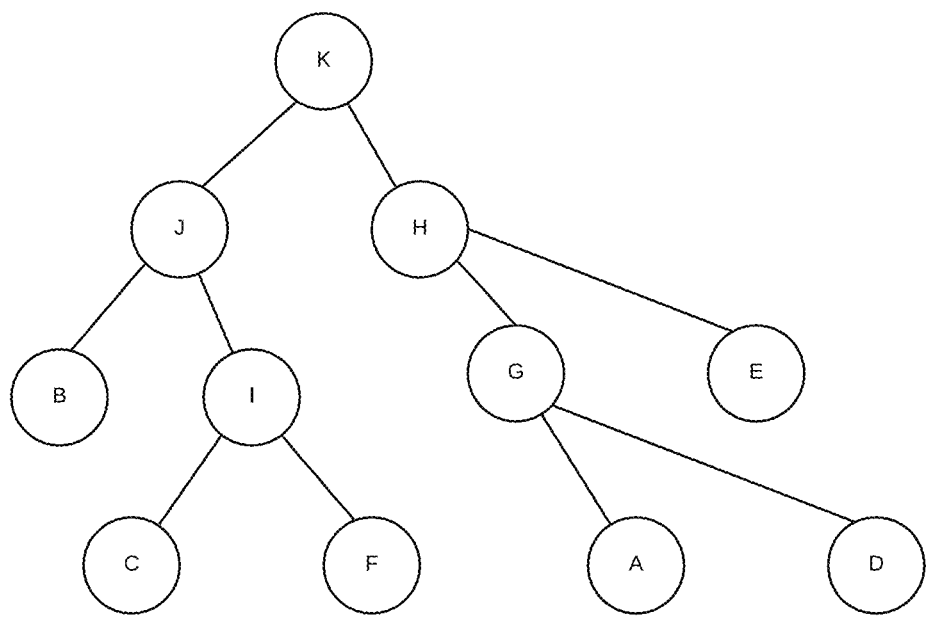
FIG. 3B is a flow diagram that illustrates the formation of label-value pairs, in accordance with one or more embodiments.

FIG. 3B illustrates an example of a binary tree created via the operations as described above in relation to FIG. 3A. In FIG. 3B, binary tree is a representation of a document with six phrase groups A-F. Each of the phrase groups A-F are represented by corresponding nodes A, B, C, D, E, and F. Each of nodes G-K represent a combination of phrase groups. A combination of phrase groups may be referred to herein as a phrase group.

Following the operations described above with respect to FIG. 3A, the distance between each pair of phrase groups is determined. The distance is determined between phrase group A and phrase group B, between phrase group A and phrase group C, and similarly between phrase group A and each of the other phrase groups D through F. Then the distance is determined between phrase group B and each of phrase groups C through F. This distance computation process is repeated until the distance is determined between each pair of phrase groups.

The pair of phrase groups with the smallest distance between them is determined. In this example, phrase group A and phrase group D are found to have the smallest distance between them, with a Cartesian distance of 50 pixels. Phrase group A and phrase group D are combined to form a phrase group G in the manner described above. Thereafter, the distance between each of the phrases is determined again using phrase group G instead of phrase groups A and D. In other words, the system determines distances between each possible pair from phrase groups B, C, E, F, and G.

After the distances between each pair of those phrase groups is found, the pair of phrase groups with the smallest distance between them is determined. In this example, phrase group G and phrase group E are found to have the smallest distance between them, with a Cartesian distance of 62 pixels. Phrase group G and phrase group E are combined to form phrase group H. Thereafter, the distance between each of the phrase groups is determined again using phrase group H instead of phrase group G and phrase group E. In other words, the system determines distances between each possible pair from phrase groups B, C, F, and H.

After the distances between each pair of those phrase groups is found, the pair of phrase groups with the smallest distance between them is determined. In this example, phrase group C and phrase group F are found to have the smallest distance between them, with a distance of 74 pixels. Phrase group C and phrase group F are combined to form phrase group I. Thereafter, the distance between each of the phrase groups is determined again using phrase group I instead of phrase groups C and F. In other words, the system determines distances between each possible pair from phrase groups B, H, and I.

After the distances between each pair of those phrase groups is found, the pair of phrase groups with the smallest distance between them is determined. In this example, phrase group B and phrase group I are found to have the smallest distance between them with a distance of 77 pixels. Phrase group B and phrase group I are combined to form phrase group J. There are only two phrases remaining, phrase groups J and H. These two phrases are combined to form phrase group K and the binary tree is complete.

The binary tree is then traversed to determine an order for the phrase groups A-F represented by the leaf nodes A-F of the binary tree. The order for phrase groups A-F is based on the order in which nodes A-F are traversed. An example method for traversing the binary tree, which should not be construed as limiting the scope of any of the claims, is presented below.

Starting from the top of the tree (phrase group K represented by the root node), the system determines if the root node has children. If a node has children, then the child node corresponding to the phrase group with the higher vertical location is traversed first. If phrase groups for both child nodes are at the same vertical location (within a tolerance), then the child node corresponding to the phrase group with the leftmost horizontal location is traversed first. In this case, phrase group K includes branches to phrase groups J and H. Phrase J is at a higher vertical location, so phrase group J is traversed first. Node J has two children, nodes B and I representing phrase groups at the same vertical height. Phrase group B has a position that is to the left of the position of phrase group I. Accordingly, node B representing phrase Group B is traversed before node I representing phrase Group I. Phrase group B corresponds to a leaf node B that has no children. Leaf node B is the first leaf node on the traversal path. As a result, phrase group B (that corresponds to leaf node B) is selected as the first phrase group in the order that is to be determined for phrase groups A-F.

After a leaf node is traversed, any un-traversed sibling node of the leaf node is traversed. Accordingly, the sibling node I of node B is traversed next. Node I has two children C and F. While phrase groups C and F are at the same vertical location, phrase group C has a position to the left of phrase group F. Accordingly, node C is traversed prior to node F. Node C has no children, therefore phrase group C is determined to be next in the order for the phrase groups A-F. The order thus far includes: (1) Phrase group B (2) phrase group C.

Thereafter, the right branch of node I is traversed, node F. Node F has no children, therefore phrase group F is determined to be next in the order for the phrase groups A-F. The order thus far includes: (1) Phrase group B (2) phrase group C (3) phrase group F.

All of the branches from node J (the left branch from node K) have been traversed. Next the sibling node of node J is traversed. The sibling node of node J is node H. Node H has two child nodes D and E. In this example, phrase group G has a higher vertical location than phrase group E, so group G is traversed next. Group G has two child nodes A and D. Phrase group D has a higher vertical position than phrase group A, so node D is traversed next. Node D has no children; therefore, phrase group D is determined to be next in the order for the phrase groups A-F. The order thus far includes: (1) Phrase group B (2) phrase group C (3) phrase group F (4) phrase group D.

The un-traversed sibling node A of node D is traversed next. Node A has no children, therefore phrase group A is determined to be next in the order for the phrase groups A-F. The order thus far includes: (1) Phrase group B (2) phrase group C (3) phrase group F (4) phrase group D (5) phrase group A.

The un-traversed sibling node E of node G is traversed next. Node E has no children, therefore phrase group E is determined to be next in the order for the phrase groups A-F. The order thus far includes: (1) Phrase group B (2) phrase group C (3) phrase group F (4) phrase group D (5) phrase group A (6) phrase group E.

The system determines that all nodes have been traversed and in response stops traversing the binary tree. The order of the phrase groups is determined as: (1) Phrase group B (2) phrase group C (3) phrase group F (4) phrase group D (5) phrase group A (6) phrase group E.

5. Bounding Boxes

A bounding box 420 is an area surrounding the phrase 410 (or a group of phrases). The bounding box fully encloses each of the characters in the phrase(s). In some embodiments, the size of the bounding box can be dependent on a size of phrase 410, with a larger phrase resulting in a larger bounding box 420.

The top-left corner of the bounding box is indicated by element 430. The top-left corner can be defined in terms of x and y coordinates, as will be described below.

Origin 440 defines a zero point of the document. In the embodiment shown in FIG. 4, the origin 440 can be set at or near the top-left corner of the document. The x-axis is defined as being in a horizontal direction, with the numbers increasing in a rightward direction. The y-axis is defined as being in a vertical direction, with the numbers increasing in a downward direction. Defining the origin 440 and x and y coordinates in this manner allows all coordinates in the document to be positive. The scale of the coordinates can be one of a variety of different scales. For example, if a document is scanned, the dots per inch of the scan may be used to set the scale of the coordinates. A scan of 100 dots per inch means that a letter sized document that is 8.5 inches wide and 11 inches long has 850 x-coordinates and 1100 y-coordinates. In some embodiments, the x-coordinates and y-coordinates are floating point numbers, allowing such embodiments to be even more precise in setting forth locations.

Width 450 is a width of the phrase 410, including bounding box 420. Height 460 is a height of the phrase 410, including bounding box 420. Width 450 and height 460 can be used in determining grouping of phrases, as described above.

Figure 4:
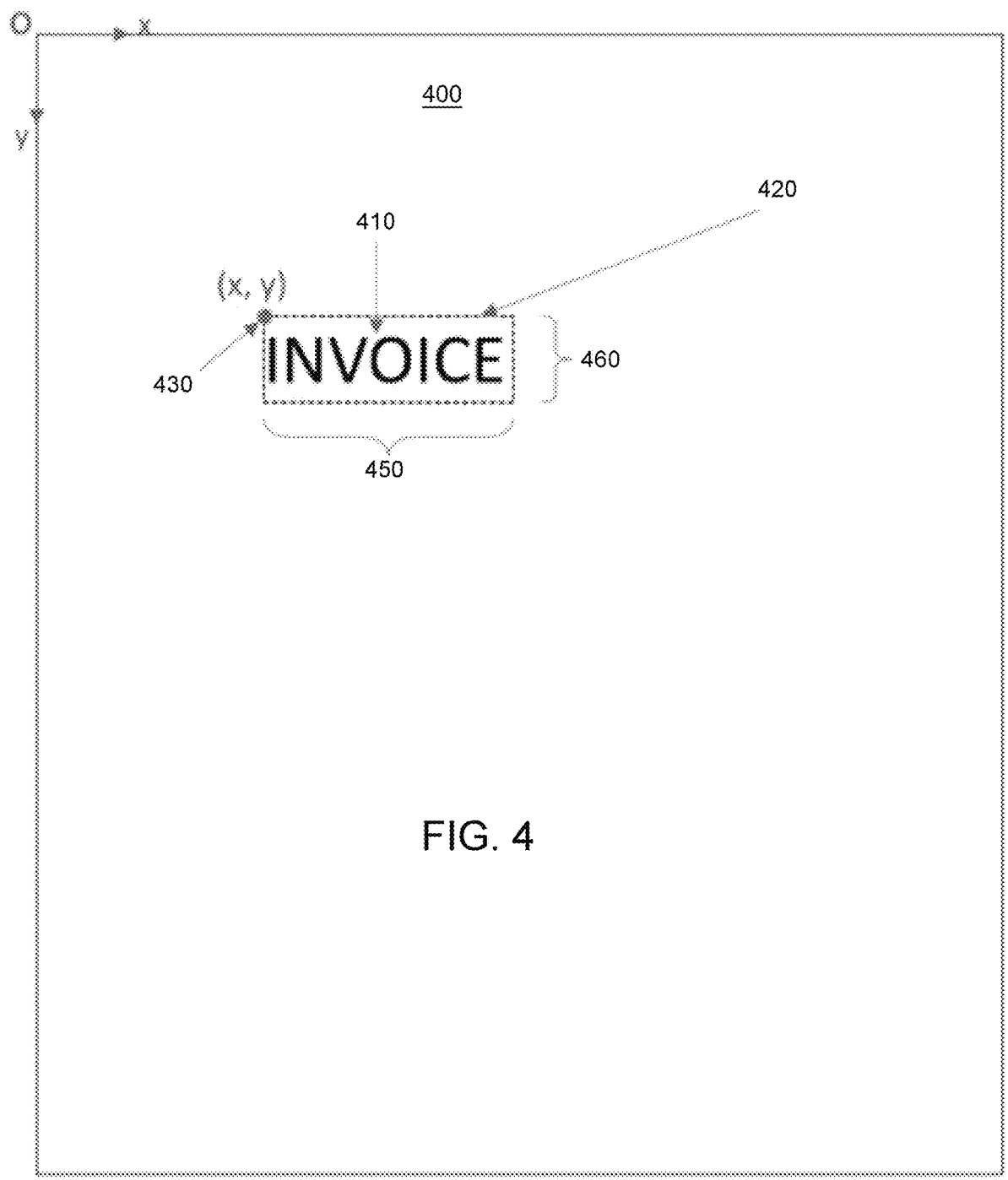
FIG. 4 is a diagram that illustrates an exemplary token.

While the characters illustrated in FIG. 4 are all letters, it should be understood that numbers and punctuation could also be part of a phrase. For example, the period at the end of a sentence could be determined to belong to the last word of a sentence. A phrase can include both numbers and letters (for example, invoice number A123). A phrase can include numbers along with punctuation (such as a decimal indicator) or an indication of currency (such as a dollar sign, Euro symbol, Yen symbol, pound sign, peso symbol, and the like).

6. Example Invoice

Figure 5:
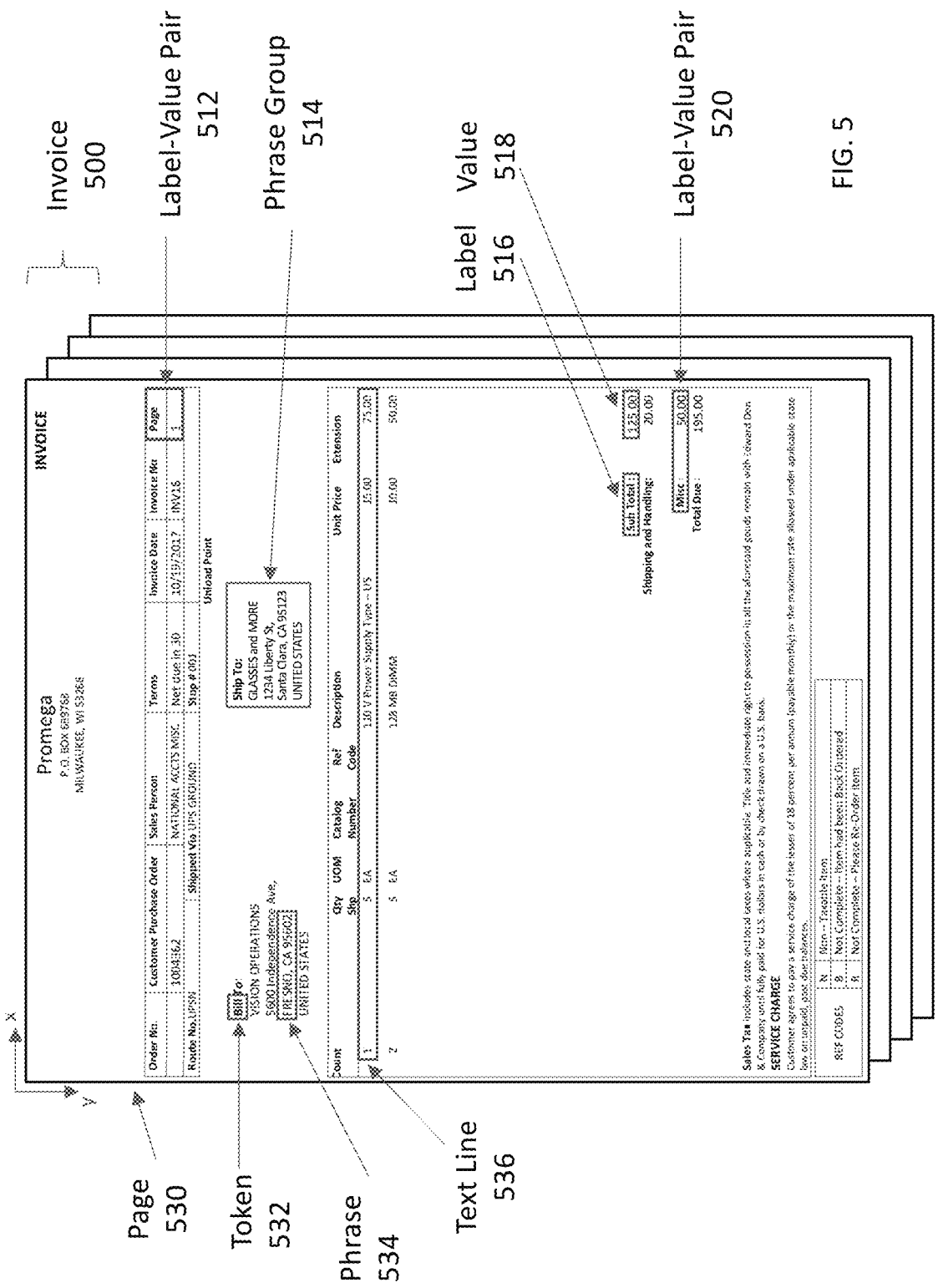
FIG. 5 is a diagram illustrating an example invoice to be processed, in accordance with one or more embodiments.

With reference to FIG. 5, an example invoice 500 is presented, to illustrate the manner in which one or more embodiments could create phrases and label-value pairs of phrases. Invoice 500 includes several tokens, with some tokens having different character heights and different character widths.

Invoice 500 may include any number of pages. Each page may be processed separately. An example page 530 of invoice 500 is illustrated in FIG. 5. Page 530 may have been received in paper format. Thereafter, the paper would have been scanned or photographed to result in the electronic image document to be processed by one or more embodiments. Page 530 may have been received in an electronic format. For example, companies often send invoices in a PDF or image format.

Each individual word is considered a token. An example is token 532, the word "Bill". Due to the space between the word "Bill" and the following word "To:" each of the words would be considered separate tokens.

A phrase corresponds to a set of one or more tokens that is intended to describe a single element. Multiple phrases can be merged into a single phrase. An example of a phrase is presented as phrase 534, "FRESNO, Calif. 95602". Phrase 534 can be grouped with other phrases to generate a single value-phrase: "Vision Operations 5600 Independence Ave., Fresno, Calif. 95602 Untied States." The value-phrase corresponds to a label-phrase "Bill To:". The label-phrase and value-phrase may be grouped together to generate a particular group of phrases. As an example, phrase group 514 illustrates a group of phrases.

The presence of the different phrase groups for the billing address and shipping address illustrates an advantage of one or more embodiments. If invoice 500 was processed using a traditional OCR method, the words might be extracted from the document in a left to right, top to bottom manner. The resulting document from OCR may read "Bill To: Ship To:" on one line and "VISION OPERATIONS" and "GLASSES AND MORE" as the next line.

A text line is shown as text line 536. A text line comprises a series of tokens that are on the same horizontal line (within a threshold distance). In an invoice, a text line 536 may be a line item of an item purchased or ordered, so the tokens belong together. In some instances, a text line may be part of a table.

Other elements that can be included in an invoice include a label 516, a value 518, and a label-value pair 520. Based on characteristics of a tokens, a token may be evaluated to be a label 516. A label 516 indicates what another token represents. In this case, label 516 is "Sub Total:".

Value 518 is typically associated with a label. In this case, value 518 is "125.00". Because label 516 is associated with value 518, this indicates that the sub total of this page is $125.00. The formation of labels and values is described above in further detail.

Label-value pair 520 is a label and a value with the indication that they are associated with each other. In this case label-value pair 520 are associated with each other because they are on the same line horizontally. However, it should be understood that a label and value could be associated with each other due to a vertical relationship. This is shown in label-value pair 512, which associates the label "page" with the value "1". The label is "Misc:" and the value is "50.00". As described above in further detail, "Misc:" is associated with "50.00" because it is a left neighbor that includes an association symbol (":").

Figure 6:
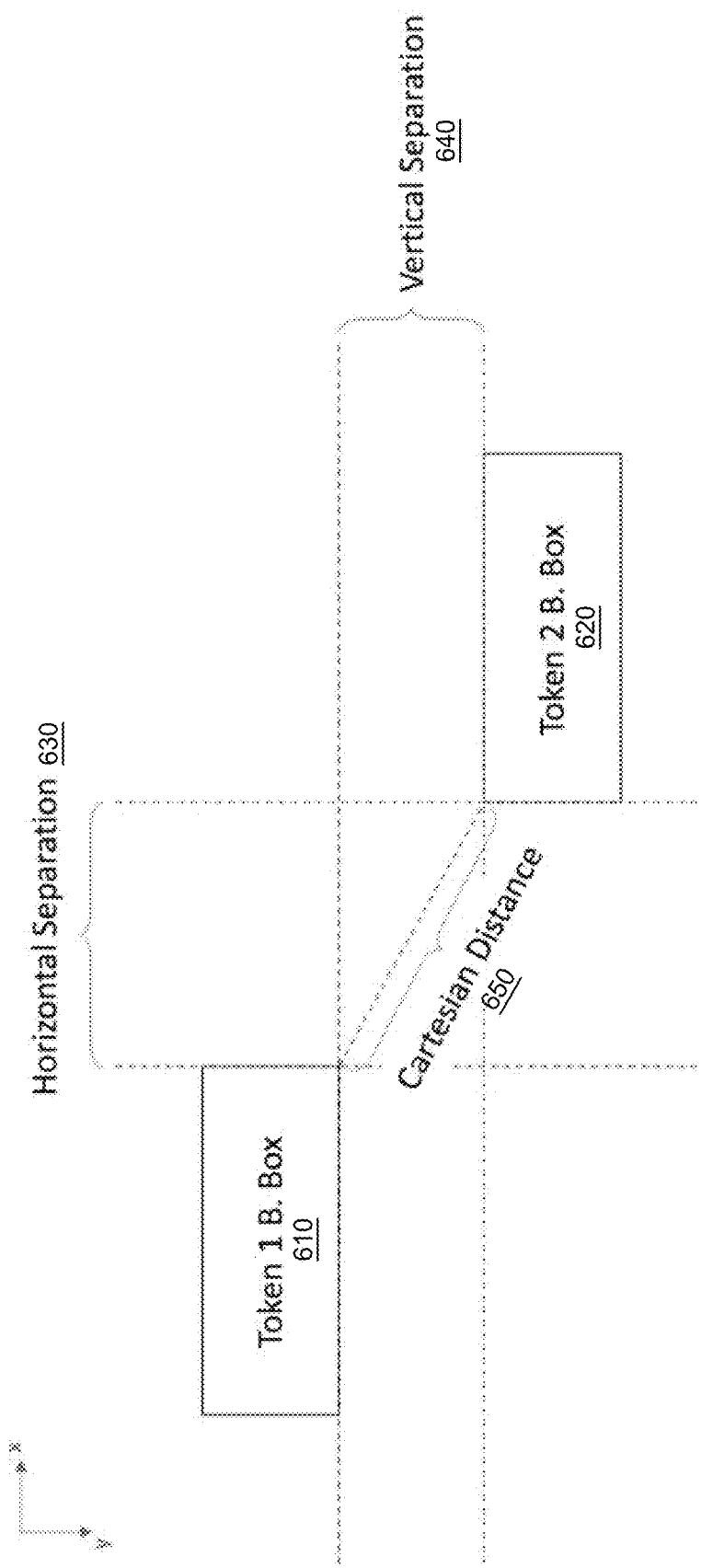
FIG. 6 is a diagram that illustrates distances between two tokens.

With reference to FIG. 6, an example is presented of two phrases (with associated bounding boxes) 610 and 620. When determining how close together two phrases are, a variety of measurements can be made.

A horizontal separation 630 can be determined between token 610 and token 620. Using the coordinate system described above, the horizontal separation 630 can be determined by subtracting the x-coordinate of the right-most edge of token 610 from the x-coordinate of the left-most edge of token 620.

In a similar manner, vertical separation 640 can be determined by subtracting the y-coordinate of the bottom-most edge of token 610 from the y-coordinate of the top-most edge of token 620.

A Cartesian distance (also known as a Euclidean distance) 650 can be calculated using the horizontal separation 630 and the vertical separation 640. As is well-known, a Cartesian distance can be calculated by adding the square of the horizontal separation 630 with the square of vertical separation 640. Thereafter, the square root is taken of that sum to determine the Cartesian distance 650. For purposes of calculating the Cartesian distance, the closest corners of the respective bounding boxes are generally used. Other methods of measuring distance, such as Manhattan distance (the distance between two points measured along axes at right angles), also can be used.

Figure 7:
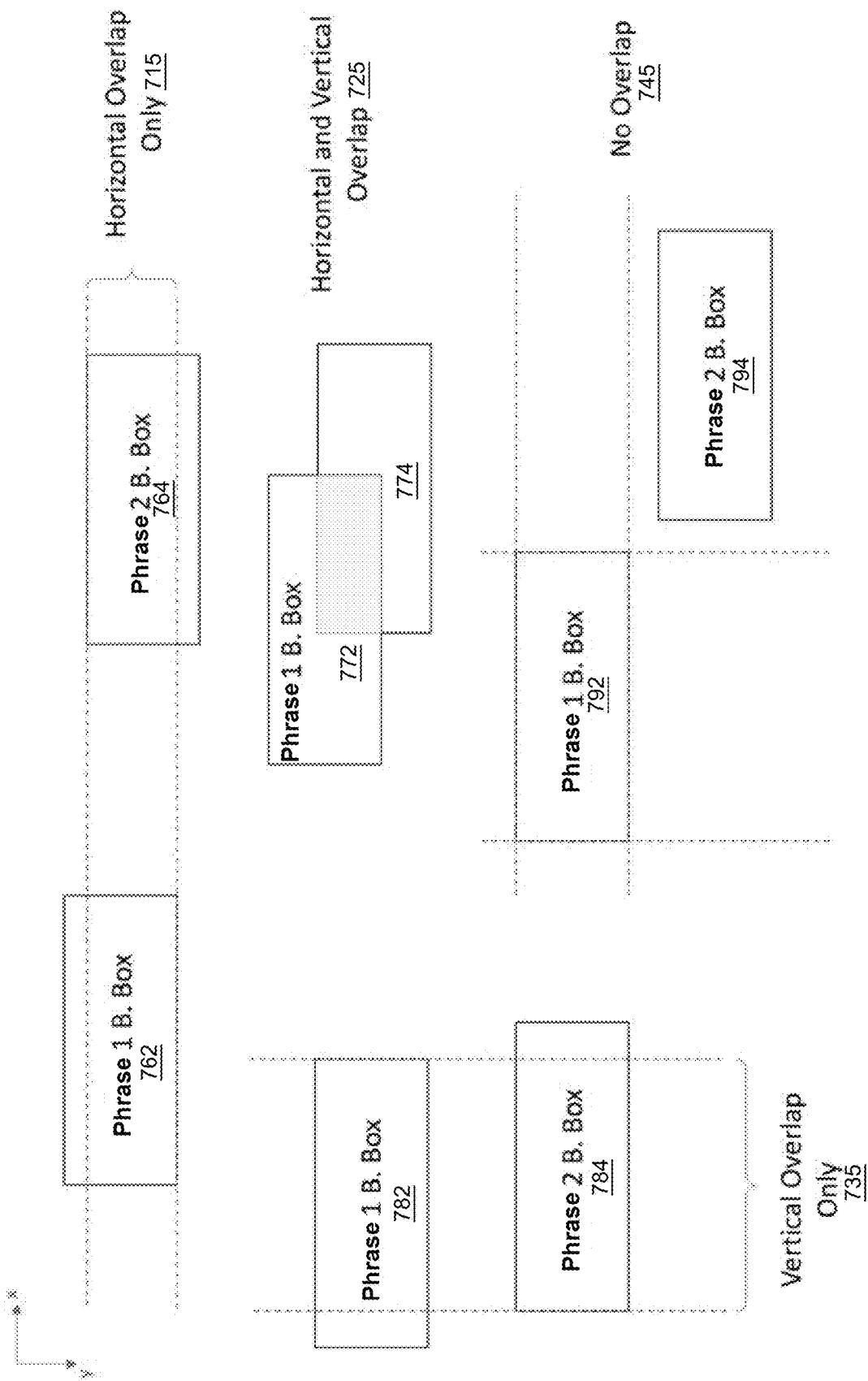
FIG. 7 is a diagram that illustrates various relationships between two tokens.

With reference to FIG. 7, possible relationships between two phrases are shown. There may be two phrases that have a horizontal overlap 715. Horizontal overlap occurs when there is at least a partial overlap between the y-axis values of the phrases. As seen in FIG. 7, phrase 762 horizontally overlaps with phrase 764 because there is an overlap in the y-coordinate ranges. Because there is no overlap in the x-coordinate values, there is no vertical overlap.

A vertical overlap 735 is seen between phrase 782 and phrase 784. Vertical overlap occurs when there is at least a partial overlap between the x-axis values of the tokens. Phrase 782 horizontally overlaps with phrase 784 because there is an overlap in the y-coordinate ranges. Because there is no (or minimal) overlap in the x-coordinate values, there is no vertical overlap.

Both horizontal and vertical overlap 725 is seen between phrase 772 and phrase 774. Both vertical and horizontal overlap occur when there is at least a partial overlap in both the x-axis values and the y-axis values of the tokens. As seen in FIG. 7, token 772 horizontally overlaps with token 774 because there is an overlap in the y-coordinate ranges. In addition, token 772 vertically overlaps with token 774 because there is an overlap in the x-coordinate ranges.

There is no overlap between phrase 792 and phrase 794. No overlap is determined as a function of determining no vertical overlap and no horizontal overlap. No overlap between phrase 792 and phrase 794 is indicative of no relationship existing between phrase 792 and phrase 794.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
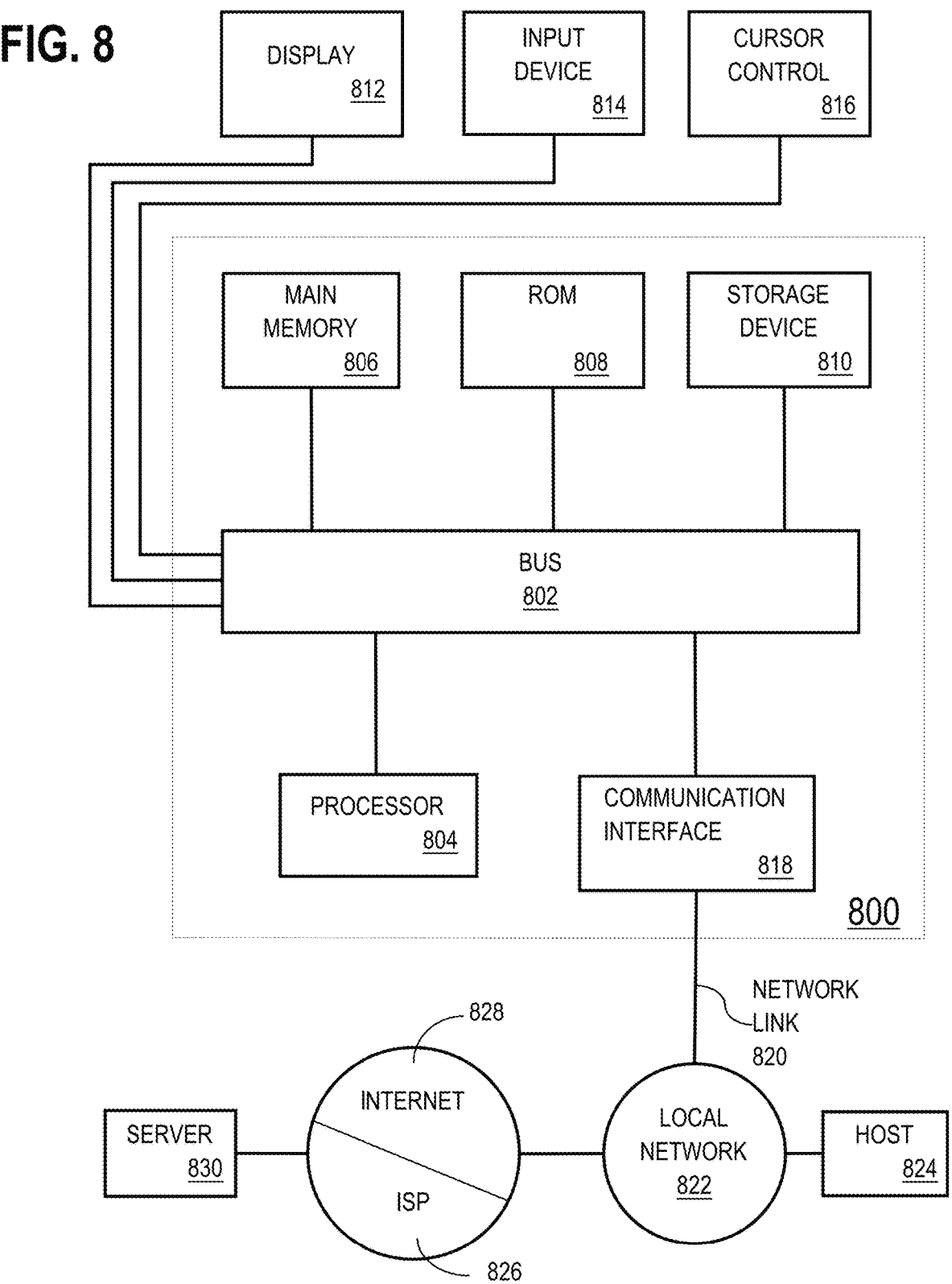
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
   identifying a plurality of phrases rendered in an electronic document;
   identifying a first phrase, of the plurality of phrases rendered in the electronic document, that comprises a digit;
   determining (a) that a second phrase, of the plurality of phrases rendered in the electronic document, does not include any digit;
   determining (b) that a first set of x and y coordinates associated with the first phrase as rendered within the electronic document is within a threshold Cartesian distance of a second set of x and y coordinates associated with the second phrase as rendered within the electronic document;
   responsive at least to determining (a) and (b), assigning both the first phrase and the second phrase to a same group in a plurality of groups;
   determining an order for the groups in the plurality of groups based at least on a Cartesian distance between pairs of groups in the plurality of groups;
   storing, transmitting, or presenting information identifying members of each group, of the plurality of groups, based on the order determined for the plurality of groups; and
   storing, transmitting, or presenting the groups in the plurality of groups based on the order determined for the groups,
   wherein the distances between pairs of groups comprise the Cartesian distance between closest corners of respective bounding boxes corresponding to the groups in the pairs of groups.

2. The non-transitory computer readable media of claim 1, wherein the assigning operation is further responsive to determining that the second phrase ends in an association symbol.

3. The non-transitory computer readable media of claim 2, wherein the association symbol comprises a colon.

4. The non-transitory computer readable media of claim 1, wherein the assigning operation is further responsive to determining that the second phrase is one of:
   a left-neighbor of the first phrase such that the first phrase and second phrase (a) include overlapping ranges of corresponding vertical positions in the electronic document and (b) a horizontal position of the second phrase is to the left a horizontal position of the first phrase in the electronic document;
   an above-neighbor of the first phrase such that the first phrase and second phrase include overlapping ranges of corresponding horizontal positions in the electronic document.

5. The non-transitory computer readable media of claim 1, wherein the assigning operation is further responsive to determining that no other phrases are located between the first phrase and the second phrase in the electronic document.

6. The non-transitory computer readable media of claim 1, wherein the operations further comprise:
   responsive to determining that horizontal spacing between a pair of tokens is less than a threshold value:
      assigning both tokens in the pair of tokens to a same third phrase.

7. The non-transitory computer readable media of claim 6, wherein the threshold value is computed by multiplying an average character width of characters in the third phrase with a horizontal tolerance factor.

8. The non-transitory computer readable media of claim 1, wherein the operations further comprise:
   creating a binary tree by recursively grouping the plurality of groups until each group of the plurality of groups are grouped into a same group corresponding to a root node of the binary tree:
   determining a Cartesian distance between each pair of groups of the plurality of groups to determine a set of Cartesian distances;
   assigning phrase groups to nodes of the binary tree at least by:
      identifying a particular pair of phrase groups, of the pairs of phrase groups, with a smallest Cartesian distance of the set of Cartesian distances;
      assigning each phrase group in the particular pair of phrase groups to a respective child node of a same parent node;

grouping each phrase group in the particular pair of phrase groups into a same phrase group for the recursive grouping of the plurality of groups.

9. The non-transitory computer readable media of claim 1, wherein the threshold distance is based on an average character height of characters in the first phrase.

10. The non-transitory computer readable media of claim 1, wherein identifying a third phrase, of the plurality of phrases, comprises:
   detecting an indication of currency in the electronic document;
   identifying a numerical value closest to the indication of currency;
   assigning the indication of currency and the numerical value closest to the indication of currency to the same third phrase.

11. The non-transitory computer readable media of claim 1, wherein storing the groups comprises writing information describing the groups in a second document formatted using a markup language.

12. The non-transitory computer readable media of claim 1, wherein determining (b) comprises:
   identifying a first bounding box, within the electronic document, corresponding to the first phrase such that the first phrase is within the first bounding box;
   determining the first set of x and y coordinates associated with the first phrase based on the first bounding box;
   identifying a second bounding box, within the electronic document, corresponding to the second phrase such that the second phrase is within the second bounding box; and
   determining the second set of x and y coordinates associated with the second phrase based on the second bounding box.

13. The non-transitory computer readable media of claim 12, wherein the first set of x and coordinates correspond to a corner of the first bounding box that is closest to the second bounding box, and wherein the second set of x and y coordinates correspond to a corner of the second bounding box that is closest to the first bounding box.

14. A method comprising:
   identifying a plurality of phrases rendered in an electronic document, wherein text corresponding to each phrase, in the plurality of phrases, are on a same text line in the electronic document;
   identifying a first phrase, of the plurality of phrases rendered in the electronic document, that comprises a digit;
   determining (a) that a second phrase, of the plurality of phrases rendered in the electronic document, does not include any digit;
   determining (b) that a first set of x and y coordinates associated with the first phrase as rendered within the electronic document is within a threshold Cartesian distance of a second set of x and y coordinates associated with the second phrase as rendered within the electronic document;
   responsive at least to determining (a) and (b), assigning both the first phrase and the second phrase to a same group in a plurality of groups;
   storing information identifying members of each group of the plurality of groups;
   determining an order for the groups in the plurality of groups based at least on Cartesian distances between pairs of groups in the plurality of groups;
   storing, transmitting, or presenting the groups, in the plurality of groups, based on the order determined for the groups,
   wherein the method is executed by at least one device including a hardware processor,
   wherein the distances between pairs of groups comprise the Cartesian distance between closest corners of respective bounding boxes corresponding to the groups in the pairs of groups.

15. The method of claim 14, wherein determining (b) comprises:
   identifying a first bounding box, within the electronic document, corresponding to the first phrase such that the first phrase is within the first bounding box;
   determining the first set of x and y coordinates associated with the first phrase based on the first bounding box;
   identifying a second bounding box, within the electronic document, corresponding to the second phrase such that the second phrase is within the second bounding box; and
   determining the second set of x and y coordinates associated with the second phrase based on the second bounding box.

16. The method of claim 15, wherein the first set of x and coordinates correspond to a corner of the first bounding box that is closest to the second bounding box, and wherein the second set of x and y coordinates correspond to a corner of the second bounding box that is closest to the first bounding box.

17. A system comprising:
   at least one device including a hardware processor;
   the system being configured to perform operations comprising:
   identifying a plurality of phrases rendered in an electronic document, wherein text corresponding to each phrase, in the plurality of phrases, are on a same text line in the electronic document;
   identifying a first phrase, of the plurality of phrases rendered in the electronic document, that comprises a digit;
   determining (a) that a second phrase, of the plurality of phrases rendered in the electronic document, does not include any digit;
   determining (b) that a first set of x and y coordinates associated with the first phrase as rendered within the electronic document is within a threshold Cartesian distance of a second set of x and y coordinates associated with the second phrase as rendered within the electronic document;
   responsive at least to determining (a) and (b), assigning both the first phrase and the second phrase to a same group in a plurality of groups;
   storing information identifying members of each group of the plurality of groups;
   determining an order for the groups in the plurality of groups based at least on Cartesian distances between pairs of groups in the plurality of groups; and
   storing, transmitting, or presenting the groups, in the plurality of groups, based on the order determined for the groups,
   wherein the distances between pairs of groups comprise the Cartesian distance between closest corners of respective bounding boxes corresponding to the groups in the pairs of groups.

18. The system of claim 17, wherein determining (b) comprises:

identifying a first bounding box, within the electronic document, corresponding to the first phrase such that the first phrase is within the first bounding box;

determining the first set of x and y coordinates associated with the first phrase based on the first bounding box;

identifying a second bounding box, within the electronic document, corresponding to the second phrase such that the second phrase is within the second bounding box; and determining the second set of x and y coordinates associated with the second phrase based on the second bounding box.

19. The system of claim 18, wherein the first set of x and y coordinates correspond to a corner of the first bounding box that is closest to the second bounding box, and wherein the second set of x and y coordinates correspond to a corner of the second bounding box that is closest to the first bounding box.

20. One or more non-transitory computer readable media comprising instructions which, when executed by one or more hardware processors, causes performance of operations comprising:

identifying a plurality of phrases rendered in an electronic document;

identifying a first phrase, of the plurality of phrases rendered in the electronic document, that comprises a digit;

determining (a) that a second phrase, of the plurality of phrases rendered in the electronic document, does not include any digit;

determining (b) that a first set of x and y coordinates associated with the first phrase as rendered within the electronic document is within a threshold Cartesian distance of a second set of x and y coordinates associated with the second phrase as rendered within the electronic document;

responsive at least to determining (a) and (b), assigning both the first phrase and the second phrase to a same group in a plurality of groups; and storing, transmitting, or presenting information identifying members of each group of the plurality of groups, wherein the assigning operation is further responsive to determining that the second phrase is one of:

a left-neighbor of the first phrase such that the first phrase and second phrase (a) include overlapping ranges of corresponding vertical positions in the electronic document and (b) a horizontal position of the second phrase is to the left of a horizontal position of the first phrase in the electronic document;

an above-neighbor of the first phrase such that the first phrase and second phrase include overlapping ranges of corresponding horizontal positions in the electronic document, wherein determining that the second phrase is a left-neighbor of the first phrase comprises:

determining an absolute height difference between a (a) first height corresponding to a tallest character in the first phrase and (b) a second height corresponding to a tallest character in the second phrase;

dividing the absolute height difference by a lowest value of the first height and the second height to compute a normalized height; and determining that the normalized height is less than a threshold value.

21. One or more non-transitory computer readable media comprising instructions which, when executed by one or more hardware processors, causes performance of operations comprising:

identifying a plurality of phrases rendered in an electronic document;

identifying a first phrase, of the plurality of phrases rendered in the electronic document, that comprises a digit;

determining (a) that a second phrase, of the plurality of phrases rendered in the electronic document, does not include any digit;

determining (b) that a first set of x and y coordinates associated with the first phrase as rendered within the electronic document is within a threshold Cartesian distance of a second set of x and y coordinates associated with the second phrase as rendered within the electronic document;

responsive at least to determining (a) and (b), assigning both the first phrase and the second phrase to a same group in a plurality of groups;

determining an order for the groups in the plurality of groups based at least on a Cartesian distance between pairs of groups in the plurality of groups;

storing, transmitting, or presenting information identifying members of each group, of the plurality of groups, based on the order determined for the plurality of groups; and storing, transmitting, or presenting the groups in the plurality of groups based on the order determined for the groups, wherein the operations further comprise:

creating a binary tree by recursively grouping the plurality of groups until each group of the plurality of groups are grouped into a same group corresponding to a root node of the binary tree:

determining a Cartesian distance between each pair of groups of the plurality of groups to determine a set of Cartesian distances;

assigning phrase groups to nodes of the binary tree at least by:

identifying a particular pair of phrase groups, of the pairs of phrase groups, with a smallest Cartesian distance of the set of Cartesian distances;

assigning each phrase group in the particular pair of phrase groups to a respective child node of a same parent node; and grouping each phrase group in the particular pair of phrase groups into a same phrase group for the recursive grouping of the plurality of groups.

22. The non-transitory computer readable media of claim 21, wherein the operations further comprise:

selecting a current node based on the current node being associated with a group, of a subset of groups among the plurality of groups, with a highest vertical position;

traversing the binary tree from the current node at least by:

responsive to determining that the current node has children nodes:

identify vertical positions of the subset of groups, of the plurality of groups, corresponding to any indirect or direct children nodes of the current node;

responsive to determining that the current node does not have any children node:

(a) adding the current node to an ordered list of groups in the plurality of groups;

(b) adding any sibling node of the current node to the ordered list of groups in the plurality of groups subsequent to ordered list of groups subsequent to the current node, wherein the sibling node of the current node is a node that shares a same parent as the current node;

(c) select a sibling node of the current node's parent node as the current node and repeat the traversing operation.

23. One or more non-transitory computer readable media comprising instructions which, when executed by one or more hardware processors, causes performance of operations comprising:

identifying a plurality of phrases rendered in an electronic document;

identifying a first phrase, of the plurality of phrases rendered in the electronic document, that comprises a digit;

determining (a) that a second phrase, of the plurality of phrases rendered in the electronic document, does not include any digit;

determining (b) that a first set of x and y coordinates associated with the first phrase as rendered within the electronic document is within a threshold Cartesian distance of a second set of x and y coordinates associated with the second phrase as rendered within the electronic document;

responsive at least to determining (a) and (b), assigning both the first phrase and the second phrase to a same group in a plurality of groups;

determining an order for the groups in the plurality of groups based at least on a Cartesian distance between pairs of groups in the plurality of groups;

storing, transmitting, or presenting information identifying members of each group, of the plurality of groups, based on the order determined for the plurality of groups; and storing, transmitting, or presenting the groups in the plurality of groups based on the order determined for the groups, wherein the assigning operation is further responsive to determining that the second phrase is one of:

a left-neighbor of the first phrase such that the first phrase and second phrase (a) include overlapping ranges of corresponding vertical positions in the electronic document and (b) a horizontal position of the second phrase is to the left of a horizontal position of the first phrase in the electronic document;

an above-neighbor of the first phrase such that the first phrase and second phrase include overlapping ranges of corresponding horizontal positions in the electronic document, wherein the assigning operation is further responsive to determining that the second phrase is a closest phrase of a pair of phrases neighboring the first phrase as a left-neighbor and an above-neighbor.

24. One or more non-transitory computer readable media comprising instructions which, when executed by one or more hardware processors, causes performance of operations comprising:

identifying a plurality of phrases rendered in an electronic document;

identifying a first phrase, of the plurality of phrases rendered in the electronic document, that comprises a digit;

determining (a) that a second phrase, of the plurality of phrases rendered in the electronic document, does not include any digit;

determining (b) that a first set of x and y coordinates associated with the first phrase as rendered within the electronic document is within a threshold Cartesian distance of a second set of x and y coordinates associated with the second phrase as rendered within the electronic document;

responsive at least to determining (a) and (b), assigning both the first phrase and the second phrase to a same group in a plurality of groups;

determining an order for the groups in the plurality of groups based at least on a Cartesian distance between pairs of groups in the plurality of groups;

storing, transmitting, or presenting information identifying members of each group, of the plurality of groups, based on the order determined for the plurality of groups; and storing, transmitting, or presenting the groups in the plurality of groups based on the order determined for the groups, wherein the assigning operation is further responsive to determining that the second phrase is one of:

a left-neighbor of the first phrase such that the first phrase and second phrase (a) include overlapping ranges of corresponding vertical positions in the electronic document and (b) a horizontal position of the second phrase is to the left of a horizontal position of the first phrase in the electronic document; and an above-neighbor of the first phrase such that the first phrase and second phrase include overlapping ranges of corresponding horizontal positions in the electronic document, wherein the assigning operation is further response to determining that the second phrase is an only phrase of a pair of phrases, neighboring the first phrase as a left-neighbor and an above-neighbor, that comprises an association symbol.

* * * * *

UNITED STATES PATENT AND TRADEMARK OFFICE
CERTIFICATE OF CORRECTION

PATENT NO. : 11,615,244 B2
APPLICATION NO. : 16/776721
DATED : March 28, 2023
INVENTOR(S) : Erdemir et al.

It is certified that error appears in the above-identified patent and that said Letters Patent is hereby corrected as shown below:

In the Claims

In Column 19, Line 38, In Claim 13, delete "x and" and insert -- x and y --, therefor.

In Column 20, Line 25, In Claim 16, delete "x and" and insert -- x and y --, therefor.

In Column 21, Line 14, In Claim 19, delete "x and" and insert -- x and y --, therefor.

Signed and Sealed this
Sixth Day of February, 2024

Katherine Kelly Vidal
*Director of the United States Patent and Trademark Office*